(12) United States Patent
Tami

(10) Patent No.: US 11,670,160 B1
(45) Date of Patent: Jun. 6, 2023

(54) MULTI-FUNCTION REMOTE CONTROL

(71) Applicant: Mu-Chen Tami, Taichung (TW)

(72) Inventor: Mu-Chen Tami, Taichung (TW)

( * ) Notice: Subject to any disclaimer, the term of this patent is extended or adjusted under 35 U.S.C. 154(b) by 0 days.

(21) Appl. No.: 17/149,722

(22) Filed: Jan. 15, 2021

(51) Int. Cl.
  *G08C 17/02* (2006.01)
  *G06F 3/048* (2013.01)

(52) U.S. Cl.
  CPC .............. *G08C 17/02* (2013.01); *G06F 3/048* (2013.01); *G08C 2201/42* (2013.01)

(58) Field of Classification Search
  CPC ............................ G08C 17/02; G08C 2201/42
  See application file for complete search history.

(56) References Cited

U.S. PATENT DOCUMENTS

2002/0171624 A1* 11/2002 Stecyk ................. H04L 12/282
  345/156
2010/0138764 A1* 6/2010 Hatambeiki ..... H04N 21/42224
  715/765
2013/0322846 A1* 12/2013 Ferren ...................... H04N 5/91
  386/234

* cited by examiner

*Primary Examiner* — Jeff A Burke
*Assistant Examiner* — Sihar A Karwan

(57) ABSTRACT

A multi-function remote control contains: a new remote control and a network control system. The new remote control includes two control panels, and each of the two control panels including a first learning unit, a learning button, and multiple blank buttons. A first learning unit of a first control panel includes a radio frequency (RF) module, and the RF module includes a first emitter element and a first receiver element. A second learning unit of a second control panel includes an infrared (IR) module which includes a second emitter element configured to send first infrared signals, and the IR module includes a second receiver element configured to receive second infrared signals of another electrical remote control. Furthermore, the second receiver element is also configured to send the second infrared signals to the integration chip.

4 Claims, 5 Drawing Sheets

MULTI-FUNCTION REMOTE CONTROL

BACKGROUND OF THE INVENTION

This application is a Continuation-in-Part of application Ser. No. 16/672,199, filed Nov. 1, 2019.

FIELD OF THE INVENTION

The present invention relates to a multi-function remote control which is applied to integrate functions of buttons of at least one electrical remote control of at least one electrical equipment and remote control functions of a network control system.

DESCRIPTION OF THE PRIOR ART

A system and method for flexible configuration of a controlling device is disclosed in US Publication No. US20100138764A1 and is applied to create a user interface for the controlling device. The created user interface includes user interface elements that are associated with functional operations of a virtual equivalent of an appliance. After the created user interface is transferred to the controlling device, the virtual equivalent of an appliance is caused to be linked to an intended target appliance whereupon activation of those user interface elements of the graphical user interface that were associated with functional operations of the virtual equivalent of an appliance will cause the controlling device to transmit commands to control corresponding functional operations of the intended target appliance.

The following generally discloses an editor program for use in configuring a user interface of a controlling device, together with a configurable controlling device such as a hand-held remote control unit. The editor program allows a user to create on a personal computer for downloading to the controlling device a graphical user interface comprised of user interface pages having icons which icons, when activated on the controlling device, cause the controlling device to perform a function, such as to transmit a command to an appliance, to change the user interface display, etc. The editor program provides, among other things, for selection and placement of icons onto user interface display pages, assignment of commands to function keys (both iconic and hard keys), assignment of backgrounds to user interface pages or groups of pages, creation of icon-activated user-defined command sequences, pre-rendering of user interface pages prior to downloading of the user interface to the controlling device, etc. Advantageously, in an exemplary embodiment the user interface editor and the operating software of the controlling device may also support the creation and editing of n-state widgets, which are unitary GUI objects comprising one or more touch activated areas together with one or more display graphics (not necessarily in a one-for-one relationship) and which are capable of both initiating parameterized command functions in response to touch inputs, as well as receiving and acting upon status responses from target appliances. Each of the attributes of an n-state widget (touch area(s), command functions, display data, response behavior) are abstracted from the others and may be independently edited, and not all are required to be present in a given instance of such a widget.

The following discloses a controlling device having a face panel on which is carried a user interface activatable to cause transmission of at least one command to at least one appliance. Turning now to the figures, wherein like reference numerals refer to like elements, FIG. 1 illustrates an exemplary system including controllable appliances, such as a set top box ("STB") 104, a DVD player 106, an audio amplifier/receiver 108, a television 102, a lighting fixture 110 and associated multilevel dimmer 114, and a thermostat 112 as well as a controlling device 100. The controlling device 100 is capable of transmitting commands to the appliances, using any convenient IR or RF, point-to-point or networked, protocol to cause the appliances to perform operational functions. While illustrated in the context of a STB 104 with DVD player 106, audio system 108, television 102, lighting fixture 110 and thermostat 112 it is to be understood that controllable appliances can include, but are not limited to, televisions, VCRs, DVRs, DVD players, cable or satellite converter set-top boxes (STBs), amplifiers, media streaming devices, CD players, game consoles, home lighting, drapery controls, fans, HVAC systems, thermostats, door locks, security systems and cameras, personal computers, etc., and, as such, the instant exemplary disclosures are not intended to be limiting as to type or quantity of controllable appliances or equipment.

As contemplated in the above referenced and related U.S. patent application Ser. Nos. 11/357,681 and 11/218,900 and provisional applications 60/608,183 and 60/705,926, the graphical user interface ("GUI") and certain functionalities of controlling device 100 may be defined via a software based editing tool 300 which may be supplied as an application program to be installed on a PC 302 running an operating system, for example, a Microsoft "Windows" brand operating system, as generally illustrated in FIGS. 3 a and 3 b and described in further detail hereinafter. In the illustrative examples that follow, it will be appreciated by those skilled in the art that development tools such as Microsoft's Visual Studio, the C# programming language, and various third party libraries may be used to facilitate creation of the software comprising exemplary editing tool 300 and exemplary controlling device 100 GUI and functionality.

Editor application 300 may be offered by the manufacturer of the controlling device 100 on a CD ROM, for download from a Web site, etc., as appropriate for installation on a PC of the user's choice. Once the editor application is installed on the user's PC 302, the controlling device GUI may be created or revised using the editor application, stored locally as a file 310 on PC 302 and/or caused to be downloaded into controlling device 100 via a hardwired connection 304, a wireless link 306 (e.g., WiFi, Bluetooth, Zigbee, etc.) or any other convenient means. Additionally, it will be appreciated that the editor application 300, although primarily resident on the user's local PC 302, may also be adapted to access additional data items from remotely located servers via the Internet 308, from appliances linked to the PC 302 via a home network, etc. Examples of such items may include, without limitation, IR command codes (e.g., to allow for support of new appliances), data which indicates operations supported by an appliance, device model number cross-references (e.g., for entering into the controlling device for set-up purposes as disclosed in, for example, U.S. Pat. No. 6,587,067), operational software updates for controlling device 100, etc. It will also be appreciated that in such an environment data may also be uploaded from PC 302 to a centralized repository, e.g., a remotely located, Internet accessible server. Such uploaded information may include, for example, current user configurations, learned IR code data, etc., and may be comprised of or derived from data stored locally on PC 302 (for example, file 310) and/or data retrieved from controlling device 100 during the times controlling device 100 is coupled to PC 302. It will also be appreciated that in alternative embodiments, all or part of the editor program itself may be resident on a Web server platform, for example in the form of ActiveX, JavaScript, etc. programming and as such the PC-based editor 300 is presented herein by way of example only, without limitation.

However, it did not disclose the specific technology for integrating the remote control functions of various household appliances and the network remote control functions into one remote control. In addition, although the general remote control interface can set multiple electrical appliances to be turned on or off at the same time in the operation interface, the conventional case does not disclose the specific technology of how to integrate multiple electrical devices on or off in a remote control.

The present invention has arisen to mitigate and/or obviate the afore-described disadvantages.

SUMMARY OF THE INVENTION

The primary aspect of the present invention is to provide a multi-function remote control which is applied to integrate functions of buttons of at least one electrical remote control of at least one electrical equipment and remote control functions of a network control system, wherein the at least one electrical equipment is any one of an air conditioner, a television (TV), a ceiling fan, a shutter door, an audio device, a lamp, and machinery or equipment for an industrial and agricultural field.

DETAILED DESCRIPTION OF THE PREFERRED EMBODIMENTS

Figure 1:
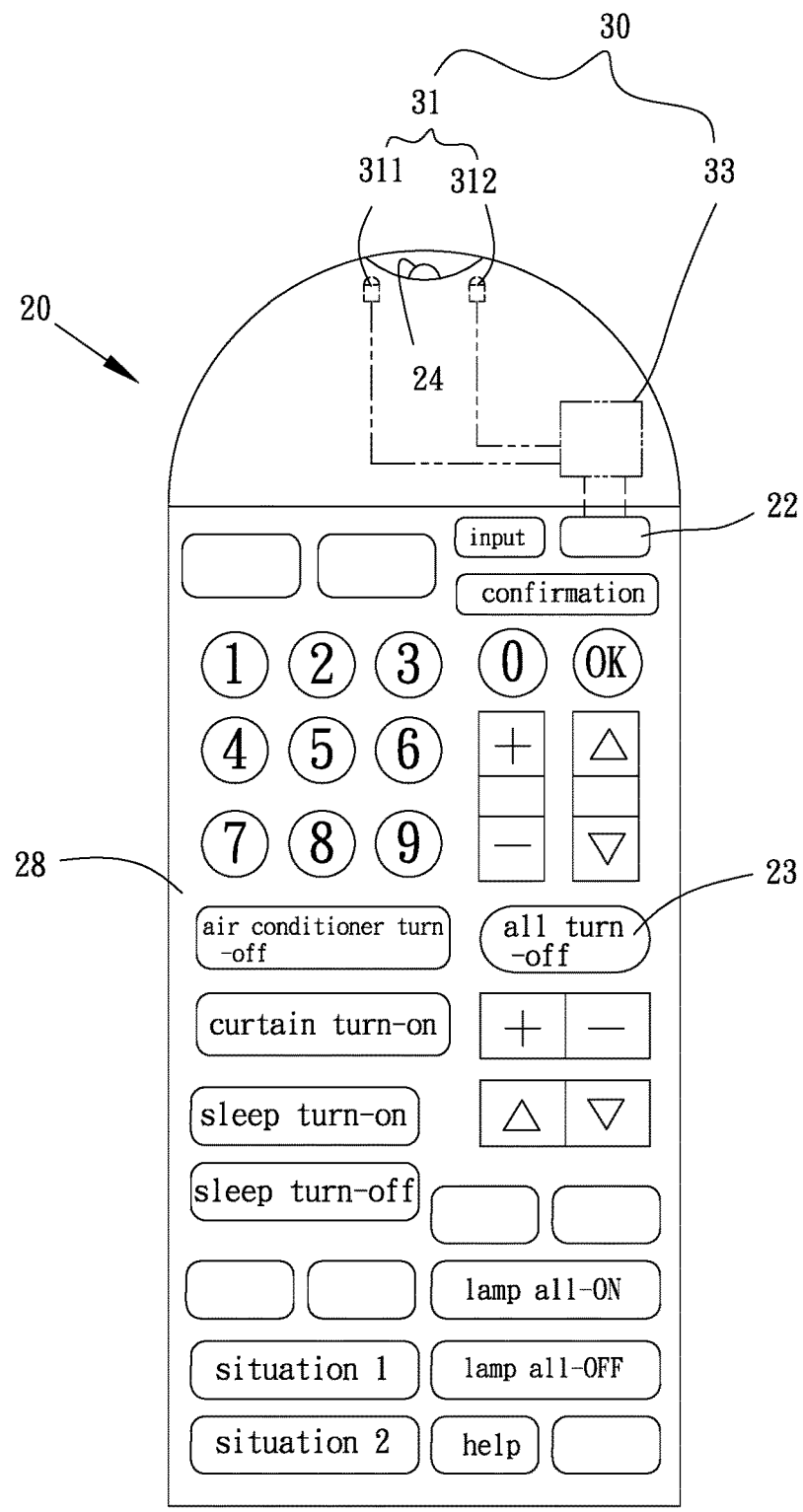
FIG. 1 is a side plane view showing the assembly of a multi-function remote control according to a preferred embodiment of the present invention.
Figure 2:
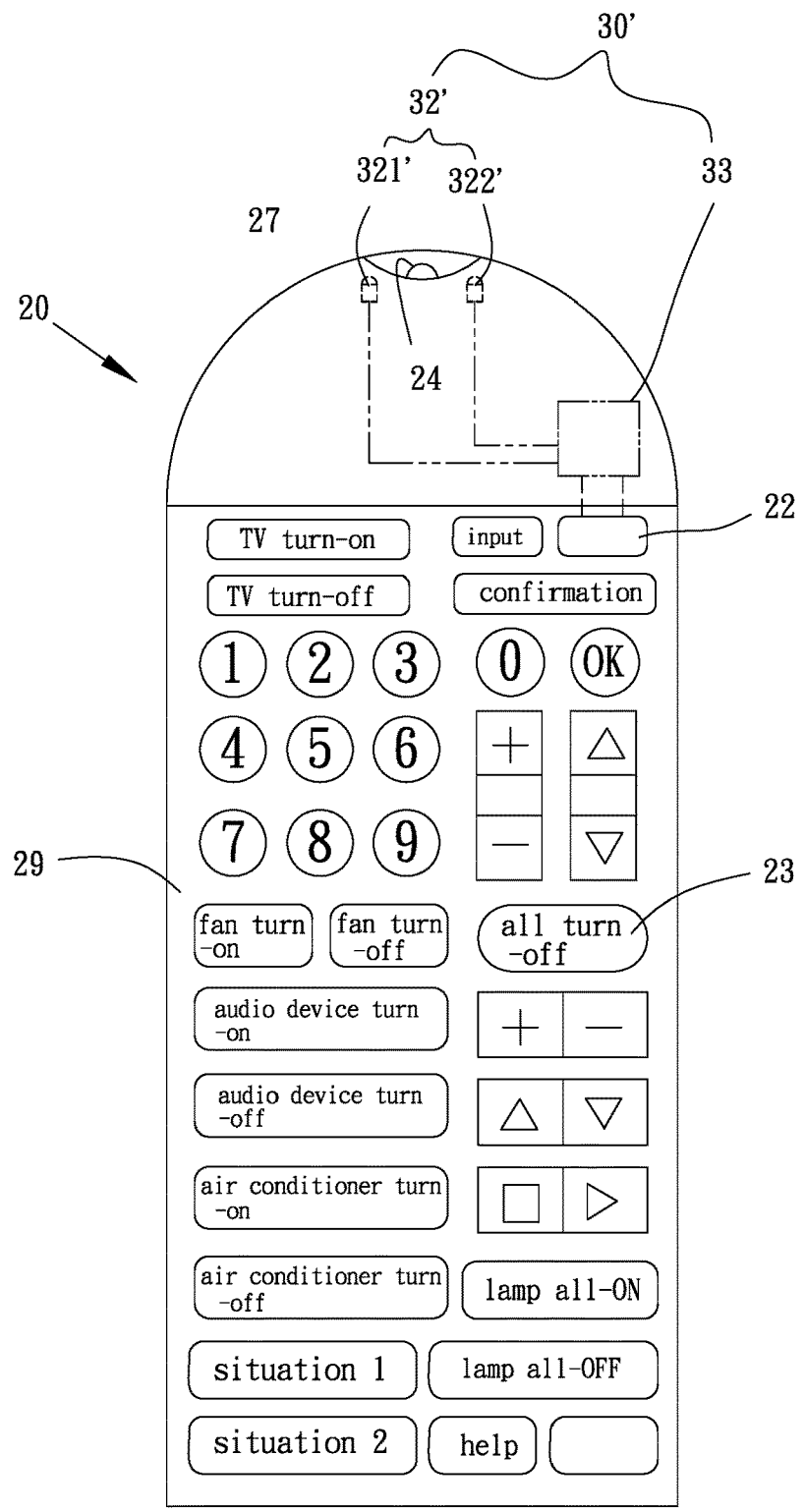
FIG. 2 is another side plan view showing the assembly of the multi-function remote control according to the preferred embodiment of the present invention.
Figure 3:
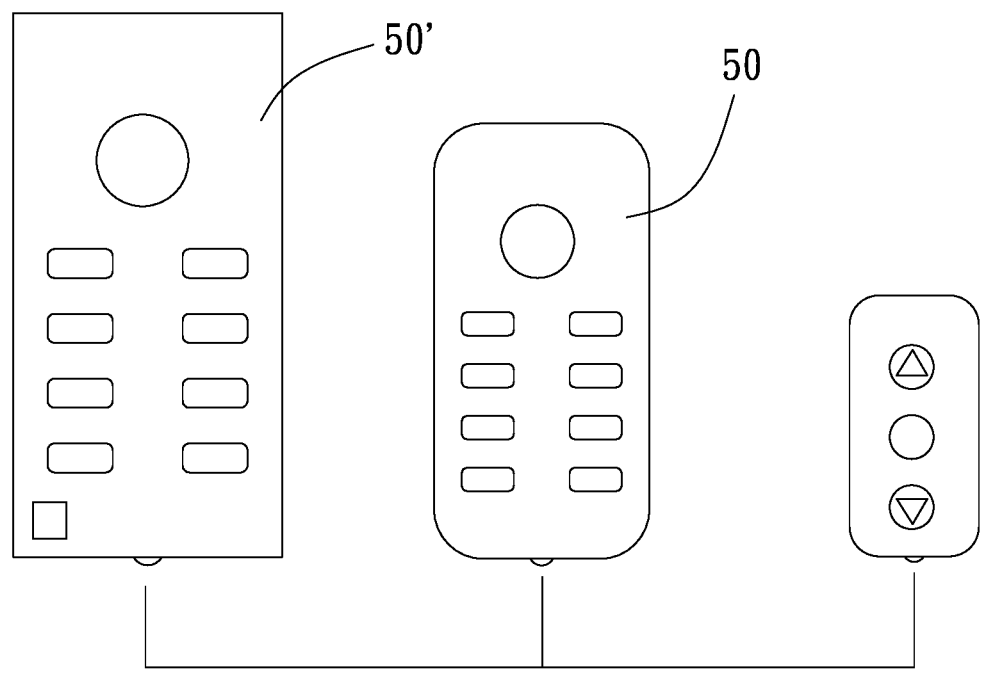
FIG. 3 is a side plan view showing the operation of the multi-function remote control according to the preferred embodiment of the present invention.
Figure 3:
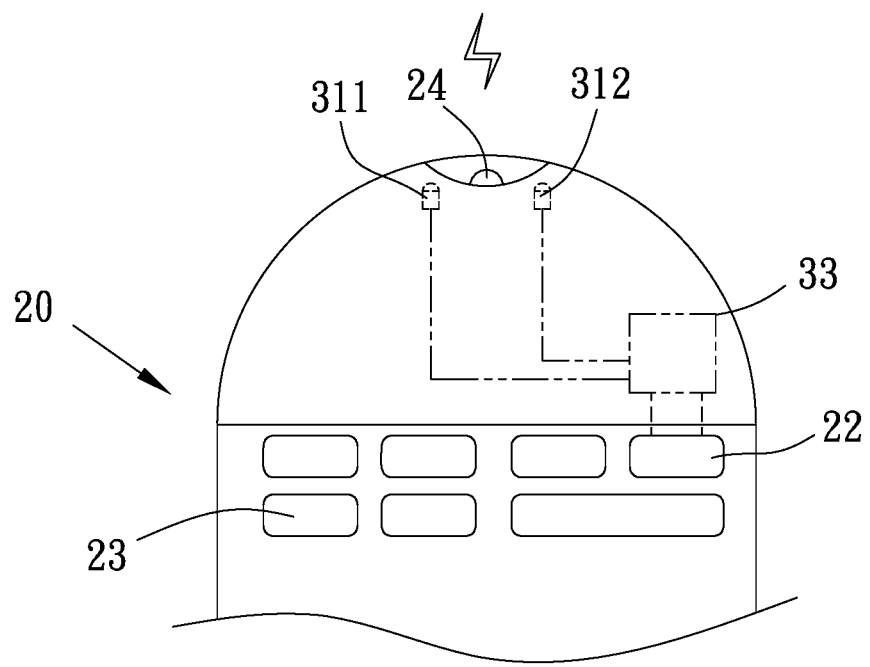
Figure 4:
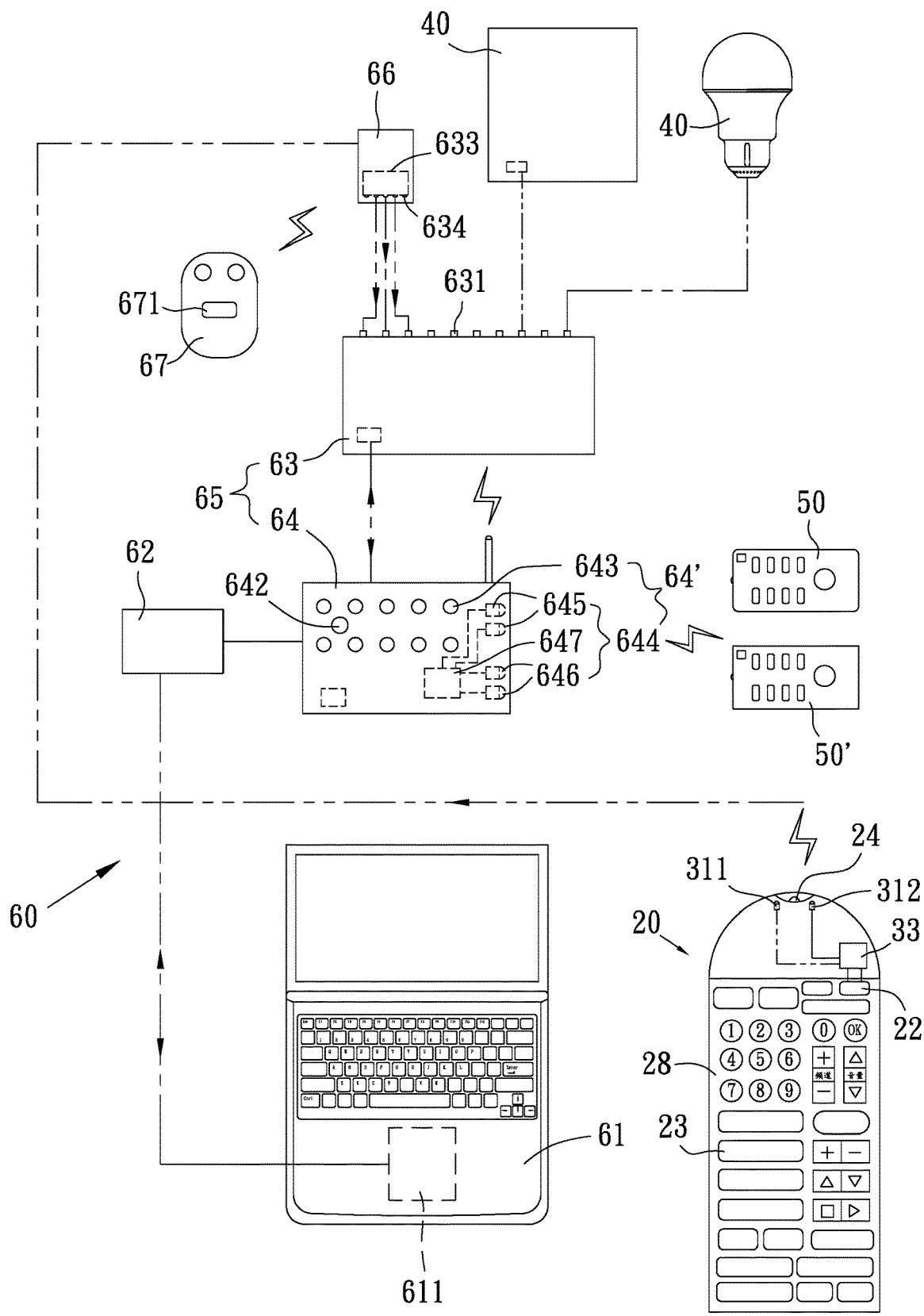
FIG. 4 is another side plan view showing the operation of the multi-function remote control according to the preferred embodiment of the present invention.

With reference to FIGS. 1-5, a multi-function remote control according to a preferred embodiment of the present invention is applied to integrate functions of buttons of at least one electrical remote control 50 of at least one electrical equipment 40 and remote control functions of a network control system 60, wherein the at least one electrical equipment 40 is any one of an air conditioner, a television (TV), a ceiling fan, a shutter door, an audio device, a lamp, and machinery or equipment for an industrial and agricultural field.

The multi-function remote control comprises a new remote control 20 including two control panels 28, 29, and each of the two control panels 28, 29 includes a first learning unit 30, a learning button 22, and multiple blank buttons 23.

The learning button 22 is pressed to start the first learning unit 30, and the multiple blank buttons 23 includes multiple preset buttons, such a TV turn-on button, a TV turn-off button, an input button, a confirmation button, multiple number buttons (such as a "0" button, a "1" button, a "2" button, . . . , a "9" button), a channel adjustment button, a volume adjustment button, an audio device turn-on button, an audio device turn-off button, a fan turn-on button, a fan turn-off button, a sleep turn-on button, a sleep turn-off button, an all turn-off button, an air conditioner turn-on button, an conditioner turn-off button, a curtain turn-on button, a curtain turn-off button, a lamp all-ON button, a lamp all-OFF button, a situation 1 button, a situation 2 button, and a help button. The new remote control 20 further comprises a light bulb 24 mounted on a front end of the new remote control 20 so as to illuminate lights in a night.

A first learning unit 30 of a first control panel 28 includes a radio frequency (RF) module 31, and the RF module 31 includes a first emitter element 311 configured to send RF signals, a first receiver element 312 configured to receive the RF signals from an electrical remote control 50 and to send the RF signals to the integration chip 33 so as to copy and learn button functions of a lamp, a ceiling fan, and a curtain.

A second learning unit 30' of a second control panel 29 includes an infrared (IR) module 32 which includes a second emitter element 321' configured to send first infrared signals, and the IR module 32 includes a second receiver element 322' configured to receive second infrared signals of another electrical remote control 50, wherein the second receiver element 322' is also configured to send the second infrared signals to the integration chip 33 via so as to copy and learn button functions of the TV, the audio device, and the air conditioner.

When the first learning unit 30 or the second learning unit 30' learns the button functions, the learning button 22 and any one blank button 23 are pressed so that a first receiver element 312' or the second receiver element 322' receives the RF signals or the IR signals from one button of multiple buttons of the first electrical remote control 50, and internal codes of a control frequency of the first electrical remote control 50 are copied to the integration chip 33, thus copying the button functions of the first electrical remote control 50 to the new remote control 20.

The network control system 60 includes a controller unit 65, at least one control box 66, a host 61, and a WiFi server 62.

The controller unit 65 includes a learning module 64' electrically connected with multiple electrical equipment 40, and a respective electrical equipment 40 includes a respective first electrical remote control 50, 50', wherein turning on, turning off or the internal codes of the control frequency of the respective electrical remote control 50, 50' are learned, copied, and saved by using the learning module 64'.

Figure 5:
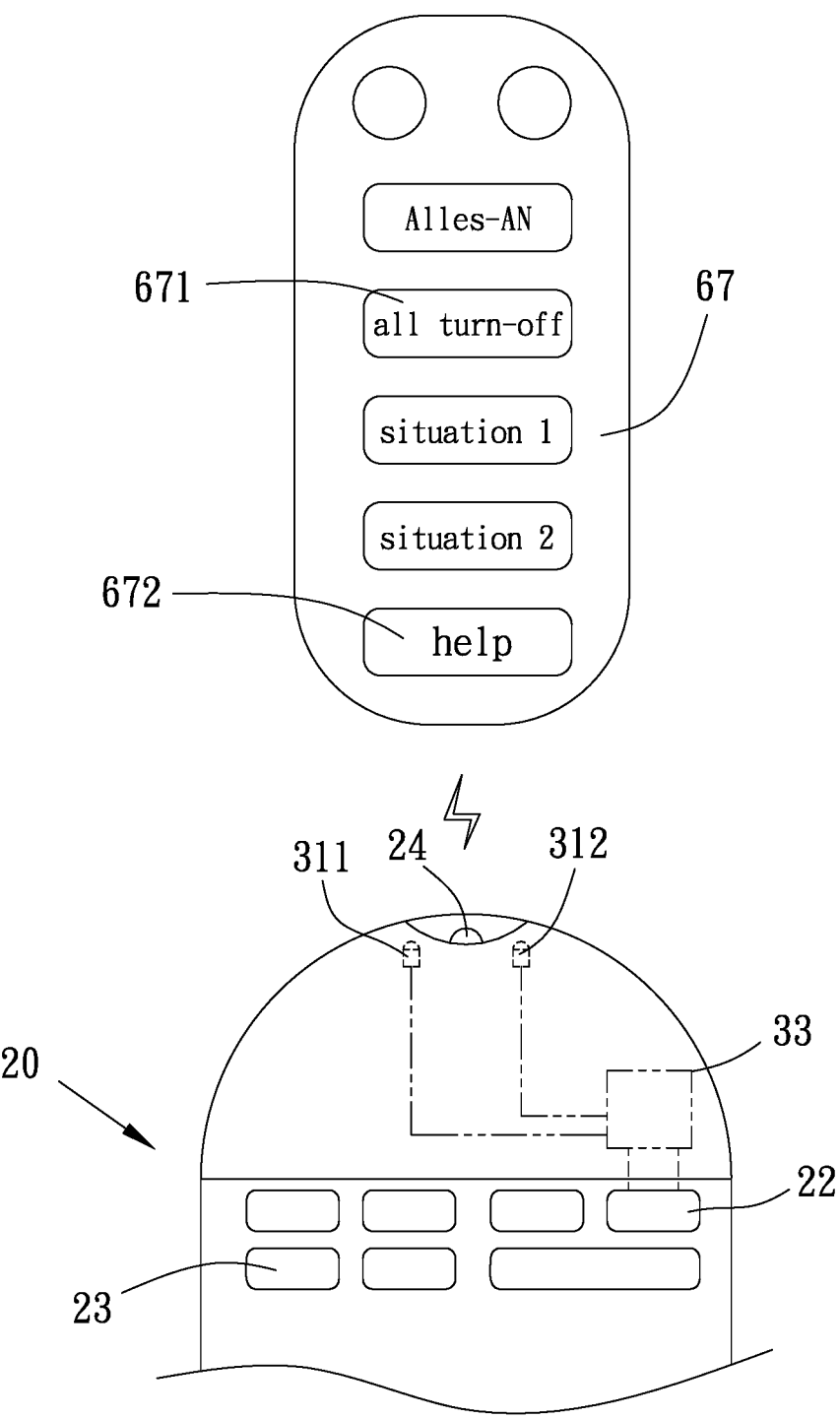
FIG. 5 is also another side plan view showing the operation of the multi-function remote control according to the preferred embodiment of the present invention.

Referring to FIG. 5, the controller unit 65 includes a first controller 63 and a second controller 64, wherein the first controller 63 has multiple wire connection portions 631 electrically connected with the respective electrical equipment 40 and the control box 64 in a wired connection manner or a wireless connection manner. The second controller 63 is configured to send IR signals or RF signals wirelessly and has the learning module 64 arranged thereon, wherein the learning module 64' has a learning button 642, multiple blank buttons 643, and a second learning unit 644.

The second learning module 644 has a radio frequency (RF) module 645, an infrared radiation (IR) module 646, and an integration chip 67. The RF module 645 is configured to receive infrared radiation (RF) signals and to send the RF signals to the integration chip 67. The IR module 646 is configured to receive infrared radiation (IR) signals from a respective one of at least one electrical remote control 50' and to send the IR signals to the integration chip 647 so that the integration chip 647 saves the IR signals.

When the network remote control 64' copies internal codes of a control frequency of a button of the respective one electrical remote control 50, 50', the button of the respective one electrical remote control 50, 50' is pressed, and the learning button 642 and any one blank button 643 are pressed so that the RF module 645 and the IR module 646 sense the RF signals and the IR signals respectively, and the RF module 645 or the IR module 646 copies the internal codes of the control frequency of the button of the respective one electrical remote control 50, 50' to the integration chip 647. Functions of the button of the respective electrical equipment 40 are edited to a control program 611 of the host 61 by ways of the learning module 64', thus setting all turn-on/turn off and partial turn on/off functions.

The control box 66 is electrically connected with the controller unit 65 and has a wireless remote control 67, wherein the wireless remote control 67 has at least one button 671, In application, a first end of a wire is connected with the multiple wire connection portions 631 of the first controller in a wired connection manner, and a second of the wire is connected with the control box 66 in the wired connection manner. The control box 66 has a wireless transmission module 633 configured to receive wireless signals, and the wireless signals are the RF signals.

The host 61 is a notebook computer or a tablet computer, and the host 61 includes the control program 611 configured to set multiple instruction codes, wherein each instruction code is edited and connected to the internal codes of the control frequency of the button of the respective one electrical remote control 50, 50' via the he controller unit 65 so as to control the turning on, turning off of the respective electrical equipment 40, and the multiple electrical equipment are set to turn on/off completely or partially. In other words, a sole instruction code is edited for each control module, and the sole instruction code is triggered after connecting with a respective button 671 of the wireless remote control 67 of the control box 66.

The WiFi server 62 is configured to send control signals between the host 61 and the controller 65. In application, the WiFi server 62 is electrically connected with the first controller 63.

The new remote control 20 matches with the network control system 60 to set all turn-off buttons, a situation 1 button, and a situation 2 button, wherein the first controller 63 is connected with one or at least one control box 66, and a turning-on function of the respective electrical equipment 40 connected with the controller unit 65 is edited to an instruction code by way of the control program 611, and the instruction code is connected to the control box 66, such that the new remote control 20 is configured to learn the internal codes of the control frequency of the button of the wireless remote control 67 of the control box 66, thus setting the all turn-off button. Furthermore, after the control program 611 edits the instruction code, the instruction code is connected with the control box 66, and the new remote control 20 is configured to learn the internal codes of the control frequency of the button of the control box 66, thus setting the situation 1 button or the situation 2 button. After the situation 1 button or the situation 2 button is pressed and set, the multiple electrical equipment are set to turn on/off completely or partially.

In another embodiment, multiple instruction codes are connected with the respective control box, for example, the wireless remote control 67 of the respective control box 66 has multiple buttons, wherein a respective button is connected with a respective instruction code. Preferably, a help button 672 is arranged on the wireless remote control 67 and is connected with another instruction code so as to dial at least one help call by using the control program 611. After starting the help button 672, the at least one help call is dialed to user's family, friends or a hospital by using the control program 611, and the new remote control 20 learns internal codes of a control frequency of the help button 672, as shown in FIG. 5, thus connecting a help module of the control program 611 with the help button of the new remote control 20.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A multi-function remote control comprising: a new remote control and a network control system;

the new remote control including two control panels, and each of the two control panels including a first learning unit, a learning button, and multiple blank buttons;

wherein a first learning unit of a first control panel includes a radio frequency (RF) module, and the RF module includes a first emitter element configured to send RF signals, a first receiver element configured to receive the RF signals from an electrical remote control and to send the RF signals to the integration chip;

wherein a second learning unit of a second control panel includes an infrared (IR) module which includes a second emitter element configured to send first infrared signals, and the IR module includes a second receiver element configured to receive second infrared signals of another electrical remote control, wherein the second receiver element is also configured to send the second infrared signals to the integration chip;

wherein when the first learning unit or the second learning unit learns button functions, the learning button and any one blank button are pressed so that a first receiver element or the second receiver element receives the RF signals or the IR signals from one button of multiple buttons of the first electrical remote control, and internal codes of a control frequency of the first electrical remote control are copied to the integration chip;

wherein the network control system includes a controller unit, at least one control box, a host, and a WiFi server;

wherein the controller unit includes a learning module electrically connected with multiple electrical equipment, and a respective electrical equipment includes a respective first electrical remote control, wherein turning on, turning off or the internal codes of the control frequency of the respective electrical remote control are learned, copied, and saved by using the learning module;

wherein the control box is electrically connected with the controller unit and includes a wireless remote control configured to receive wireless signals, and the control box includes at least one button;

wherein the host includes the control program configured to set multiple instruction codes, wherein each instruction code is edited and connected to the internal codes of the control frequency of the button of the respective one electrical remote control via the he controller unit so as to control the turning on, turning off of the respective electrical equipment, and the multiple electrical equipment are set to turn on/off completely or partially; and wherein the WiFi server is configured to send control signals between the host and the controller.

2. The multi-function remote control as claimed in claim 1, wherein the controller unit includes a first controller and a second controller, wherein the first controller has multiple wire connection portions electrically connected with the respective electrical equipment and the control box in a wired connection manner or a wireless connection manner; and the second controller is configured to send IR signals or RF signals wirelessly and has the learning module arranged thereon, wherein the learning module has a learning button, multiple blank buttons, and a second learning unit; the second learning module has a radio frequency (RF) module, an infrared radiation (IR) module, and an integration chip; the RF module is configured to receive infrared radiation (RF) signals and to send the RF signals to the integration chip; the IR module is configured to receive infrared radiation (IR) signals from a respective one of at least one electrical remote control and to send the IR signals to the integration chip so that the integration chip saves the IR signals.

3. The multi-function remote control as claimed in claim 1, wherein the new remote control matches with the network control system to set all turn-off buttons, a situation 1 button, and a situation 2 button, wherein the first controller is connected with one or at least one control box, and a turning-on function of the respective electrical equipment connected with the controller unit is edited to an instruction code by way of the control program, and the instruction code is connected to the control box, such that the new remote control is configured to learn the internal codes of the control frequency of the button of the wireless remote control of the control box, thus setting the all turn-off button; after the control program edits the instruction code, the instruction code is connected with the control box, and the new remote control is configured to learn the internal codes of the control frequency of the button of the control box, thus setting the situation 1 button or the situation 2 button; after the situation 1 button or the situation 2 button is pressed and set, the multiple electrical equipment are set to turn on/off completely or partially.

4. The multi-function remote control as claimed in claim 1, wherein the wireless remote control of the respective control box has multiple buttons, wherein a respective button is connected with a respective instruction code.

* * * * *